Nov. 12, 1968   W. SPOKOWSKI   3,410,189
VARIABLE WIDTH EXPOSURE SLIT
Filed Feb. 11, 1966

WALTER SPOKOWSKI
INVENTOR.

BY Robert J. Matthews

ATTORNEY

United States Patent Office 3,410,189
Patented Nov. 12, 1968

3,410,189
VARIABLE WIDTH EXPOSURE SLIT
Walter Spokowski, Wayland, Mass., assignor to Itek Corporation, Lexington, Mass., a corporation of Delaware
Filed Feb. 11, 1966, Ser. No. 526,796
4 Claims. (Cl. 95—12.5)

This invention relates to an apparatus for varying the width of an exposure slit of a photographic apparatus, as for example, an aerial camera.

Heretofore, changing the width of the exposure slit has been effected by direct manual manipulation of the slit blades. In other systems, the slit blades are coupled to a motor controlled rack and pinion gear device. It is apparent that the former method is difficult to perform in sophisticated reconnaissance systems and impossible where no operator is present. While the latter does permit remote control, the accuracy of the slit widths has not been satisfactory. Because of these disadvantages, it has been found best to fix the width before flight on an optimum basis and not to change the width during flight. However, the need for changing slit widths has become more acute.

In accordance with the present invention, a cam, having a first and second gradually sloping surface and a first and second cam follower, coact with the slit blades forming the slit aperture, to vary the width of the slit. The accuracy of the width dimensions is a function of the accuracy of the cam surfaces and the rotational position of the cam. For example, a cam is designed such that one degree of rotation of the cam will change the width 0.001 inch to an accuracy of 0.0001 of an inch.

It is an object of this invention to provide an improved apparatus for varying the width of an exposure slit.

Another object of this invention is to provide an improved apparatus for varying the width of an exposure slit that meets close tolerance requirements for correct exposure.

A further object of this invention is to provide an improved apparatus for varying the width of an exposure slit that is light in weight and simple in construction and operation.

Other objects and advantages of the present invention will become readily apparent to those well skilled in the art with the following description with reference to the drawings, wherein.

Figures 1, 2:
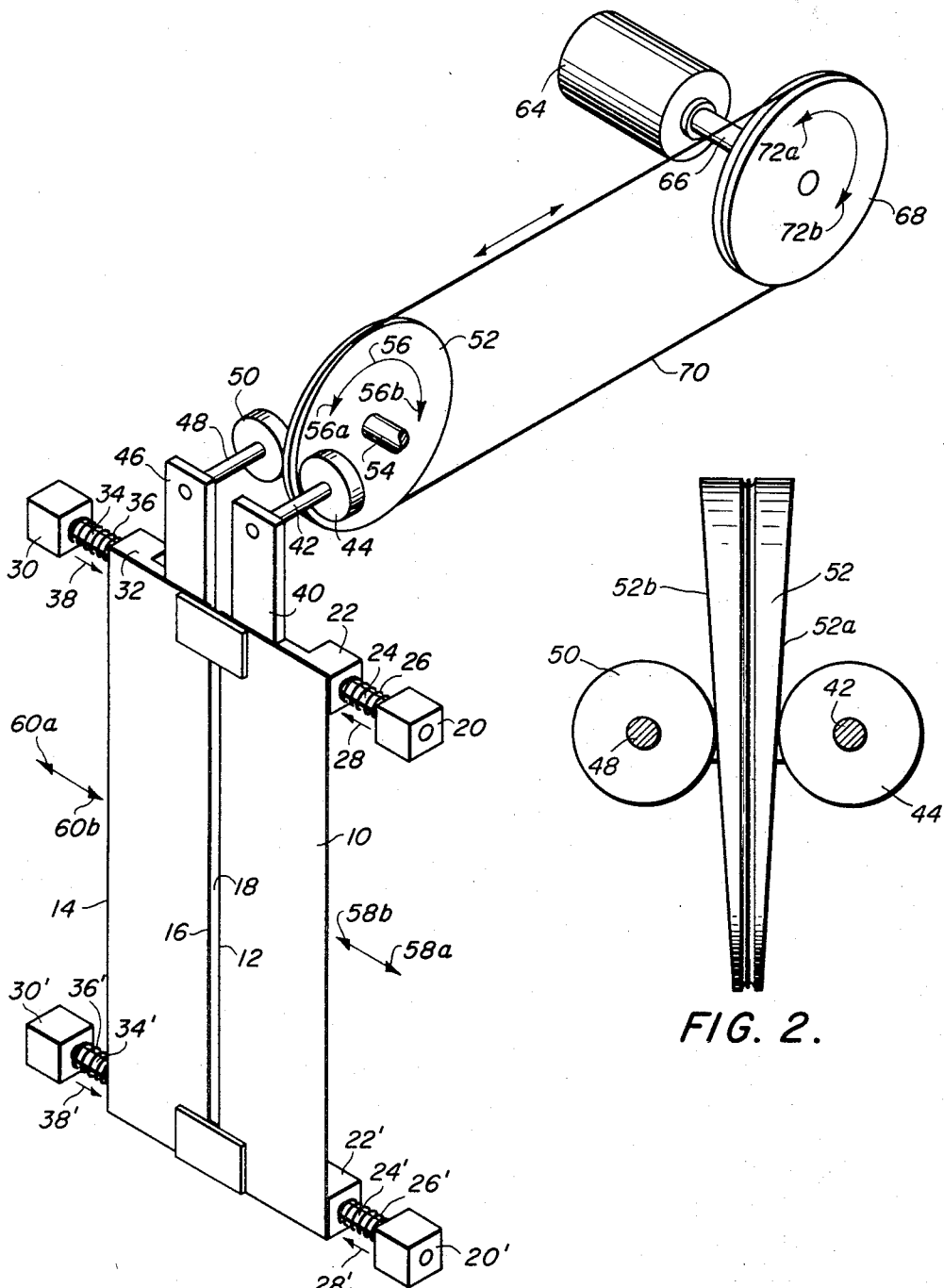
FIGURE 1 is a schematic of a preferred embodiment of the invention.
FIGURE 2 is a view showing the cam and cam followers of the preferred embodiment of FIGURE 1.

It will be noted that no particular photographic apparatus is described or shown since such apparatus forms no part of the invention.

With reference to FIGURE 1, there is shown a first aperture slit blade 10, having a first edge 12 and a second aperture slit blade 14, having a second edge 16 opposed to edge 12 to define an aperture slit 18 by the separation therebetween of edge 12 and edge 16. Blocks 20 and 20' have track bars 24 and 24' affixed thereto which slidably support blade 10 by means of drilled blocks 22 and 22'. Bars 24 and 24' have springs 26 and 26' wound thereabout to bias blade 10 in the direction indicated by arrows 28 and 28'. Similarly, blade 14 is supported on the photographic apparatus by corresponding members 30, 30', 34, 34' and 32. Springs 36 and 36' bias blade 14 in the direction indicated by arrows 38 and 38'.

One end of bar 40 is mounted to blade 10. At the other end thereof, there is journaled therein one end of a shaft 42. Rotatably mounted at the other end of shaft 42 is a cam follower 44. Similarly mounted by shaft 48 is a cam follower 50. Blade 14 has mounted at one end a bar 46 which has journaled therein one end of a shaft 48. Rotatably mounted at the other end of shaft 48 is cam follower 50.

A cam 52 is provided mounted on a cam shaft 54, which in turn is rotatably mounted so that cam 52 is free to rotate as shown by arrow 56. As is shown best in FIGURE 2, cam 52 has a first gradually sloping surface 52a on one portion thereof and a second gradually sloping surface 52b on a second portion thereof. Each symmetrical surface is engaged laterally by spring loaded cam followers 44 and 50 to insure constant contact. The cam profile is contoured so that one degree of rotation on a drive motor, further disclosed hereinafter, displaces each surface of the cam 0.0005 inch laterally, resulting in a slit width change of 0.001 inch. For example, one degree of rotation of cam 52 in the direction of arrowhead 56a will move blade 10 in the direction of arrowhead 58a 0.0005 inch and blade 14 will move in the direction of arrowhead 60a an equal amount to thereby increase the width of slit 18 one thousandth of an inch. Conversely, rotation of cam 52 in the direction of arrowhead 58b through one degree of arc will move blade 10 in the direction of arrowhead 58b an amount of 0.0005 inch and blade 14 in the direction of arrowhead 60b an amount of 0.0005 inch to narrow the width of slit 18 by 0.0001 inch.

For driving cam 52, there is provided, by way of example, a reversible motor 64, having rotatable shaft 66 thereof mounted to a drive wheel 68. To achieve coupling between drive wheel 68 and cam 52, a wire loop 70 engages a central groove in the periphery of drive wheel 68 and a central groove in the periphery of cam 52. Wire 70 will drive cam 52 directly proportional to the motor drive. Thus, to drive cam 52 in the direction of arrowhead 56a, motor 64 is activated to rotate drive wheel 68 in the direction 72a, which motion is transmitted by wire loop 70 to cam 52. Conversely, the motion of drive wheel 68 in the direction of arrowhead 72b is transmitted by wire loop 70 to rotate cam 52 in the direction of arrowhead 56b. For other applications, motor 64 can be pulsed to produce preselected slit openings.

The use of pairs of widely separator tracks snugly fitted within the drilled slit blade blocks assures parallelism between the slit edges.

The use of a slender wedge cam is an important feature of the invention since relatively large amounts of rotation of the input cam provide for very closely controlled slit width changes. Although the preferred embodiment utilizes the aforesaid symmetrical cam, other cams may be employed devoid of symmetry or double sloping surfaces.

While there has been described what is at present considered to be the preferred embodiment of this invention, it will be obvious to those skilled in the art that various changes and modifications may be made therein without departing from the invention and it is, therefore, intended in the appended claims to cover all such changes and modifications as fall within the true spirit and scope of the invention.

I claim:
1. Apparatus for varying the width of an optical slit comprising:
  first and second aperture slit blades each having an edge, said edges opposed to one another to define an aperture slit by the separation therebetween;
  at least one of said blades slidably supported upon a pair of tracks;
  a bar affixed to and extending from said one blade;
  a shaft rigidly affixed to said extended portion of said bar;
  a cam follower attached to said shaft free to rotate about said shaft;
  a cam having at least a first surface thereon coacting with said cam follower such that point contact is maintained between said surface and said cam follower;

drive means coupled to said cam to rotate said cam thereby causing said slit to vary in proportion to the contour of said surface.

2. The apparatus of claim 1 wherein said cam surface is a gradually sloping surface.

3. The apparatus of claim 1 wherein said surface is irregular.

4. Apparatus for varying the width of an optical slit comprising:

first and second aperture slit blades each having an edge, said edges opposed to one another to define an aperture slit by the separation therebetween;

each of said blades slidably supported on a pair of tracks;

a first and second pair affixed to and extending from said first and second blades respectively;

a first and second shaft rigidly affixed to said extended portion of said first and second bars respectively;

a first and second cam follower attached to said first and second shaft respectively free to rotate about said shafts;

a cam having a first and second surface thereon coacting with said first and second cam follower respectively such that point contact is maintained between said surfaces and said first and second cam followers;

drive means coupled to said cam to rotate said cam and thereby causing said slit to vary in proportion to the contour of said surface.

References Cited

UNITED STATES PATENTS 2,485,089   10/1949   Fassin _____ 350—271

JOHN M. HORAN, *Primary Examiner.*